Patented Aug. 29, 1933

1,924,947

UNITED STATES PATENT OFFICE 1,924,947

STABILIZED EGG PRODUCT

Wolf Kritchevsky, Benjamin R. Harris, and Carl J. Beckert, Chicago, Ill.

No Drawing. Application April 8, 1929
Serial No. 353,664

3 Claims. (Cl. 167—63)

Our invention relates to the art of preserving eggs, and particularly to a composition of matter, including a stabilizing medium.

We have found that when the ordinary egg-material, whether it be in the form of whole egg, or the natural egg white, as it comes from the shell, or of egg yolk or either of white or yolk with small proportions of the other material intermixed, when mixed with one of the homo-ogous series of the dihydric alcohols, like ethylene, propylene, butylene, etc. glycol, trimethylene glycol, or any of the derivatives of this homologous series, like celusolve, carbitol, etc., in a proportion such that the amount of the above named dihydric alcohols, or their derivatives, is not less than approximately 16–17% of the total amount of water contained in the aforesaid and described egg products, that such attained mixture will be stable for any length of time under ordinary room temperatures and will not spoil or deteriorate, nor assume an offensive odor.

This previously described product can then be mixed with any other commodities and chemicals, like vegetable oils, animal oils, fats, mineral oils, waxes, ordinary soaps, sulphonated oils, sulphonated soaps, and other chemical or medicinal ingredients like acetyl resorcinol, sulphur, chrysarobine, scapolamine, tars, fillers, like starch, and thus form various and different products that can be used in the cosmetic trade as a shampoo, scalp treatment, or facial massages, also for medicinal purposes like salve bases, and special salves, also for cleansing purposes like the cleaning and softening of leather etc.

This product can be obtained in any desired consistency such as a liquid, semi-paste, paste, semi-solid, or soft non-mobile condition, according to the modification of the aggregrate materials added to the originally described egg products.

For instance, in order to obtain a paste for a hair shampoo, we treat 100 pounds of fresh commercial egg-yolk, which is substantially pure egg yolk, with a small percentage of egg white contained therein, and the water content of the same being about 56–58%, with nine pounds (9#) of ethylene glycol. This product, per se, will be stable and keep for any length of time. In order to make a paste from this mixture, which is easily distributed through the hair and which is easily soluble, we add 7½ pounds of anhydrous sulphonated soap. If the soap should contain any water, sufficient ethylene glycol should be added, so that the amount of ethylene glycol present equals not less than 16% of the total water present in the finished product. More ethylene glycol may be added if desired, but it is not necessary. On the other hand, if the amount of ethylene glycol equals, or exceeds approximately 60% of the amount of water present, the egg material may precipitate, or be denatured, and thus be less suitable for this stated purpose.

Sulphonated soap, mentioned in the previous example, can be substituted or replaced with sulphonated oil, or vegetable oils, like castor oil, or corn oil, or mineral oils, like White Russian mineral oil, or vaseline, or other oily or waxy substances like diethyl phthallate, cetyl alcohol or various waxes etc.

The ethylene glycol mentioned in the foregoing example can be replaced with or substituted by di-ethylene glycol or the monoethyl ether of ethylene glycol, and any and all of the homologues of the alkyl glycols and their derivatives, and their esters, such as the mono- and di-acetates, and mixtures thereof.

Further, the commercial egg yolk mentioned in the foregoing example can be substituted with or replaced by egg white material, or that of the whole egg, in whole or in part.

The following represent a few examples of products that we find suitable for our purpose:

No. 1
| | Pounds |
|---|---|
| Egg yolk | 100 |
| Di-ethylene glycol | 9 |

No. 2
| | Pounds |
|---|---|
| Egg white | 100 |
| Ethylene glycol | 15 |

No. 3
| | Pounds |
|---|---|
| Mixed whole eggs | 100 |
| Monoethyl ether of ethylene glycol | 12.5 |

No. 4
| | Pounds |
|---|---|
| Yolk | 100 |
| Diethylene glycol | 20 |
| Sulphonated oil | 10 |
| Perfume | .5 |

No. 5
| | Pounds |
|---|---|
| Yolk | 100 |
| Propylene glycol | 15 |
| Castor oil | 100 |
| Perfume | .5 |

No. 6

| | Pounds |
|---|---|
| Whole egg | 100 |
| Acetate monoethyl ether of ethylene glycol | 15 |
| White petroleum | 3 |

No. 7

| | Pounds |
|---|---|
| Egg yolk | 100 |
| Ethylene glycol | 15 |
| Corn oil | 50 |
| Sulphur | .5 |

No. 8

| | Pounds |
|---|---|
| Egg yolk | 100 |
| Di-ethylene glycol | 20 |
| Starch | 5 |
| Perfume | .5 |

No. 9

| | Pounds |
|---|---|
| Egg yolk | 100 |
| Tri-methylene glycol | 20 |
| Chrysarobine | 2 |
| Perfume | .5 |

No. 10

| | Pounds |
|---|---|
| Egg yolk | 100 |
| Ethylene glycol | 20 |
| Ichtyol | 5 |
| Perfume | .5 |

The examples just cited are interchangeable referring to the stabilizing agent, i. e. alkyl glycols and their derivatives. This ethylene glycol may be used in place of the di-ethylene glycol, or the monoethyl ether of ethylene glycol may be used in place of either of them or vice-versa, and as a matter of fact and record, any of the alkyl glycols, their derivatives and esters and mixtures thereof may be used interchangeably or intermixed without appreciably affecting the resultant product when the amount calculated on the basis of the water content in the product is used as previously directed.

The aggregate materials such as the oils, soaps medicinal ingredients or diluents may also be varied without changing the character or fitness of the resultant product.

The interchanging of egg material, such as the whites, whites in excess of yolk material, or nearly pure egg yolk material, will also not change the character of our product for the specific uses intended.

We have also found that instead of using fresh egg material, we may utilize the dried-egg materials such as dried egg albumen, or dried yolk, by first adding and emulsifying the material with the requisite amount of water or any other liquid and then handling the same in the manner indicated in the original examples.

The quantities of the glycol derivatives may be varied in any proportion as low as that requisite for the preservation of the egg material, and as high as practical. This compound in the proportions specified is not intended for human consumption but for external application.

Under the expression "egg material" we mean either egg yolks, pure or mixed with a little white as they come from the separating plants, egg whites, pure or mixed with a little yolk as they occur naturally, as the egg is separated, mixed eggs in which the yolk and the white is mixed in their natural proportion or having added either more yolk, white or both, or powdered egg yolk and white mixed, emulsified with any desired amount of moisture, separately or together.

Under the expression "egg substance" we understand the solid matter that makes up the yolk, or the white minus the moisture present in it; in other words, egg substance and moisture would mean either natural yolk, natural white or the whole egg.

We claim:

1. A cosmetic adapted for external use and stable at normal climatic conditions comprising egg material and a preservative of the general formula $$XO-CX_2-(CX_2)_{n-1}OX$$

in which $n$ is any whole number, X is hydrogen, an alkyl group like methyl, ethyl or an hydroxy alkyl group like $-CH_2OH-CH_2CH_2OH$ or an acid radical like acetyl, and derivatives of the acid radical, said preservative being in the proportion of not less than 16 percent. of the water present in the finished product.

2. A cosmetic adapted for external use and stable at normal climatic conditions comprising egg material and a preservative comprising a dihydric alcohol of the general formula $$XO-CX_2-(CX_2)_{n-1}OX$$

in which $n$ is any whole number, X is hydrogen, an alkyl group like methyl, ethyl, or an hydroxy alkyl group like $-CH_2OH-CH_2CH_2OH$ or an acid radical like acetyl, and derivatives of the acid radical, said preservative being in the proportion of not less than 16 percent. of the water present in the finished product, and a sulphonated oil.

3. A cosmetic comprising egg yolk, diethylene glycol in the amount of not less than 16 percent. of the amount of water present in the finished product and a sulphonated oil.

WOLF KRITCHEVSKY.
    BENJAMIN R. HARRIS.
    CARL J. BECKERT.